US012272231B1

(12) United States Patent
Chien et al.

(10) Patent No.: US 12,272,231 B1
(45) Date of Patent: Apr. 8, 2025

(54) SMOKE DETECTION METHOD WITH TEMPERATURE AND DUST COMPENSATION

(71) Applicant: Climax Technology Co., Ltd., Taipei (TW)

(72) Inventors: I-Fan Chien, Taipei (TW); Zuo-Hua Zhai, Taipei (TW); Ta-Chang Fang, Taipei (TW)

(73) Assignee: Climax Technology Co., Ltd., Taipei (TW)

(*) Notice: Subject to any disclaimer, the term of this patent is extended or adjusted under 35 U.S.C. 154(b) by 18 days.

(21) Appl. No.: 18/375,523

(22) Filed: Oct. 1, 2023

(51) Int. Cl.
*G08B 29/26* (2006.01)
*G08B 17/103* (2006.01)
*G08B 29/18* (2006.01)

(52) U.S. Cl.
CPC ........... *G08B 29/26* (2013.01); *G08B 17/103* (2013.01); *G08B 29/186* (2013.01)

(58) Field of Classification Search
CPC ..... G08B 29/26; G08B 17/103; G08B 29/186
See application file for complete search history.

(56) References Cited

U.S. PATENT DOCUMENTS

2012/0126975 A1* 5/2012 Gonzales ............... G08B 29/26 340/540
2020/0320844 A1* 10/2020 Buchholz ................. G01V 8/12

FOREIGN PATENT DOCUMENTS

CN 115311835 A * 11/2022 ............. G08B 17/06
CN 115880851 A * 3/2023
DE 102016209052 A1 11/2017
EP 2363844 A1 9/2011
JP 5101181 B2 * 12/2012
JP 5974143 B2 * 8/2016 ............. G01F 1/667

OTHER PUBLICATIONS

Extended European Search Report dated Apr. 11, 2024 in related European Application No. 23204591.4.

* cited by examiner

*Primary Examiner* — Curtis A Kuntz
*Assistant Examiner* — James E Munion
(74) *Attorney, Agent, or Firm* — Donald E. Stout; Stout, Uxa & Buyan, LLP

(57) ABSTRACT

A smoke detection method with temperature and dust compensation includes providing a smoke detector that generates reading values; providing a database that stores smoke-free reference values at every temperature or at every few temperatures in a working range of temperatures, differences between the reading values and corresponding smoke-free reference values being used to detect smoke; obtaining smoke-free reference values at a current temperature from the database if temperature changes; and performing temperature learning to obtain smoke-free reference values if the smoke-free reference values do not exist in the database or when dust is detected for at least one time.

13 Claims, 2 Drawing Sheets

SMOKE DETECTION METHOD WITH TEMPERATURE AND DUST COMPENSATION

BACKGROUND OF THE INVENTION

1. Field of the Invention

The present invention generally relates to smoke detection, and more particularly to a smoke detection method with temperature and dust compensation.

2. Description of Related Art

A smoke detector is a device that senses smoke, typically as an indicator of fire. The smoke detector can be integrated with a home automation system to become a smart smoke detector. However, the smoke detector may be accumulated with dust, which is actually a common cause of accidental smoke detector activations. The build-up of dust, dirt and other debris can lower the detection threshold for the smoke detector, causing the system to enter (false) alarm when no fire is present. Moreover, the smoke detector may also be affected by temperature change, resulting in incorrect detection results.

Although many methods of detecting dust have been proposed, few methods can correct or compensate the influence of dust or temperature on the smoke detector. A need has thus arisen to propose a novel scheme to ensure that the smoke detector with dust accumulation can operate correctly over a wide range of temperatures.

SUMMARY OF THE INVENTION

In view of the foregoing, it is an object of the embodiment of the present invention to provide a smoke detection method with temperature and dust compensation capable of operating a smoke detector with dust accumulation over a wide range of temperatures.

According to one embodiment, a smoke detection method with temperature and dust compensation is disclosed. A smoke detector is provided to generate reading values. A database is provided to store smoke-free reference values at every temperature or at every few temperatures in a working range of temperatures, differences between the reading values and corresponding smoke-free reference values being used to detect smoke. Smoke-free reference values at a current temperature are obtained from the database if temperature changes. Temperature learning is performed to obtain smoke-free reference values if the smoke-free reference values do not exist in the database or when dust is detected for at least one time.

DETAILED DESCRIPTION OF THE INVENTION

Figure 1:
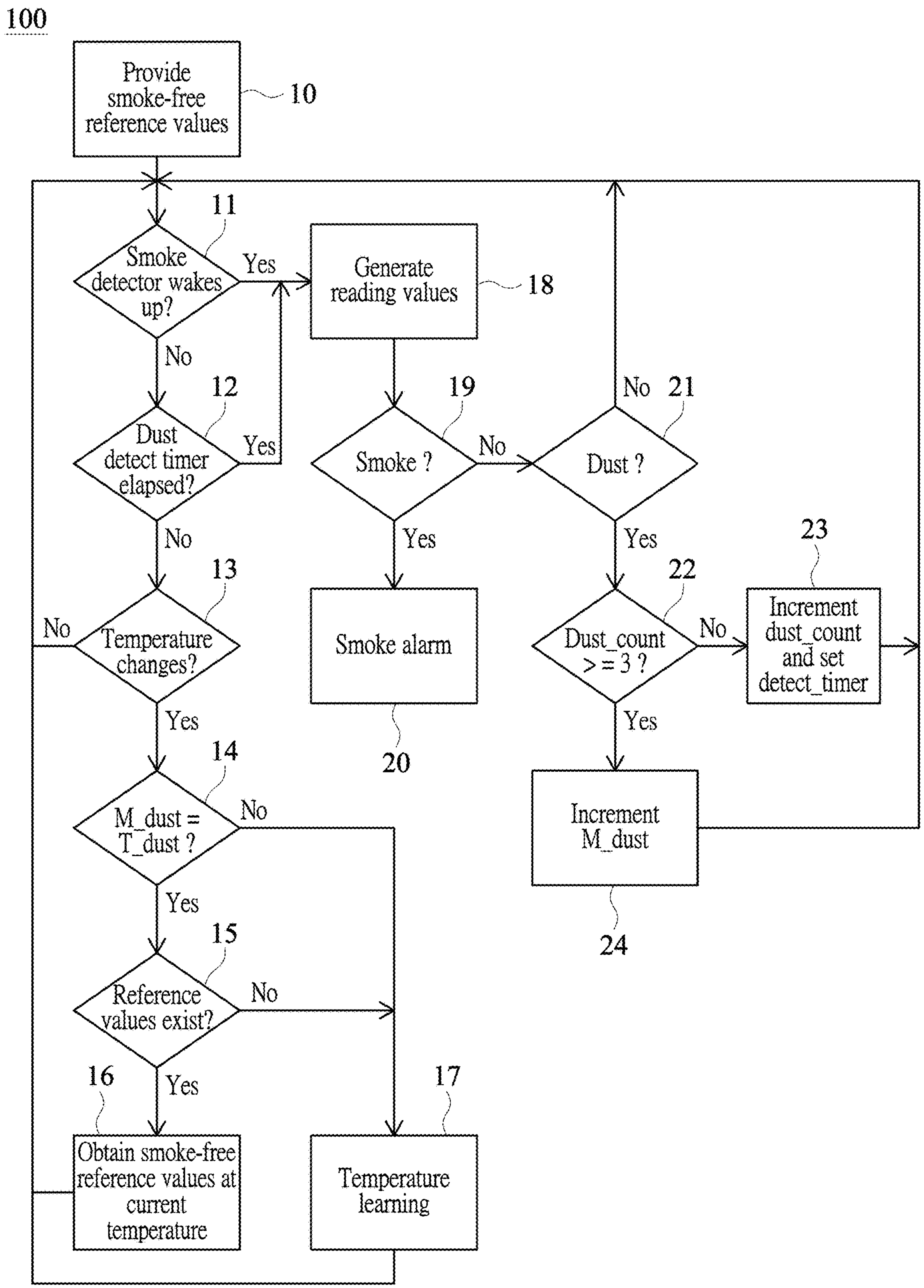
FIG. 1 shows a flow diagram illustrating a smoke detection method with temperature and dust compensation adaptable to a smoke detector according to one embodiment of the present invention.

FIG. 1 shows a flow diagram illustrating a smoke detection method with temperature and dust compensation ("smoke detection method" hereinafter) 100 adaptable to a smoke detector (not shown) according to one embodiment of the present invention. Generally speaking, the smoke detector may include at least one light source (e.g., light-emitting diode or LED) and at least one receiver sensor (e.g., photoelectric sensor such as photodiode).

In the embodiment, the smoke detector may include an infrared light source, a blue light source and two receiver sensors (e.g., a first receiver sensor and a second receiver sensor). The first receiver sensor adaptable to detect infrared light and blue light generates two reading values designated as R1 and B1, and the second receiver sensor adaptable to detect infrared light and blue light generates another two reading values designated as R2 and B2. There are four smoke-free reference (or baseline) values corresponding to the four reading values. Smoke may be detected according to differences between the reading values and the smoke-free reference values. Generally speaking, smoke may be detected according to the reading values and ratios thereof.

However, the smoke-free reference values of the receiver sensors will change with temperature change and dust accumulation. Therefore, the smoke detection method 100 of the embodiment is configured to perform temperature and dust compensation actions to adjust the smoke-free reference values to ensure that the smoke detector with dust accumulation can operate correctly over a wide range of temperatures.

Specifically, in step 10, smoke-free reference values are initially provided after the smoke detector is turned on and initialized by performing a self-test to ensure components, such as the battery, the light sources, the receiver sensors and the alarm, are working properly. In the meantime, a dust detect (countdown) timer detect_timer for measuring a specific time interval and a dust counter (or a count variable) dust_count used to count a number of times dust is detected (which will be explained later) are also initialized.

Next, it is determined in step 11 whether the smoke detector wakes up (i.e., coming out of a low-power state such as sleep mode). If the determination result in step 11 is negative, it is determined in step 12 whether the specific time interval of the dust detect timer detect_timer has elapsed. If no, the flow goes to step 13 to determine whether temperature changes, for example, by comparing a current temperature with a previous temperature. If temperature changes (yes branch of step 13), and a temporal number of dust compensation M_dust (which will be explained later) is equal to a predetermined required number of dust compensation T_dust (yes branch of step 14), smoke-free reference values at the current temperature are obtained from a database (step 16) stored in a memory device, which stores smoke-free reference values at every temperature or at every few temperatures (e.g., every 2 degrees) in a working range of temperatures (e.g., −20 to 50 degrees). However, if the required smoke-free reference values (at the current temperature) do not exist in the database (no branch of step 15), temperature learning will be performed in step 17 to obtain the required smoke-free reference values, details of which will be explained later. Alternatively, if the temporal number of dust compensation M_dust is not equal to the required number of dust compensation T_dust (no branch of step 14), temperature learning will also be performed in step 17 to obtain (or update) the required smoke-free reference values, when the dust becomes stable.

Referring back to step 11, if the determination result is affirmative, the smoke detector generates reading values in step 18, according to which smoke may be detected (step 19) according to differences between the reading values and the smoke-free reference values. It is appreciated that conventional techniques of detecting smoke may be adopted, details of which are thus omitted for brevity. If smoke is detected (yes branch of step 19), a smoke alarm is issued (step 20); otherwise, the flow goes to step 21 to detect dust in according to the reading values and ratios thereof.

In the embodiment, dust is positively detected only when dust is detected (step 21) for at least one time, for example, for predetermined (consecutive) times (e.g., 3 times), which may be executed by using a dust counter (or a count variable) dust_count used to count a number of times dust is detected (step 22). If the dust counter dust_count does not reach the predetermined (consecutive) times (no branch of step 22), the dust counter dust_count is incremented, and the dust detect timer detect_timer is set to a specific time interval (e.g., 5 seconds) (step 23). When the predetermined (consecutive) times have been reached (yes branch of step 22), the temporal number of dust compensation M_dust is incremented (step 24).

According to one aspect of the embodiment, a maintenance notification will be issued to raise attention to a user or monitoring center (or security company) when dust is accumulating. Issuing maintenance notification in the embodiment adopts a hierarchical architecture as described below. When dust as detected reaches a first threshold at which the smoke detector still functions normally, a maintenance alert notification will be issued to notify the user or monitoring center to clean the smoke detector as soon as possible to remove the dust. When dust as detected reaches a second (higher) threshold at which the smoke detector cannot function normally (for example, because no action is taken by the user or monitoring center after receiving the maintenance alert notification), a maintenance warning notification will be issued to notify the user or monitoring center to clean the smoke detector immediately to avoid subsequent false alarms. It is noted that temperature learning needs to be performed again whenever dust has been removed from the smoke detector, which affects the smoke-free reference values.

Figure 2:
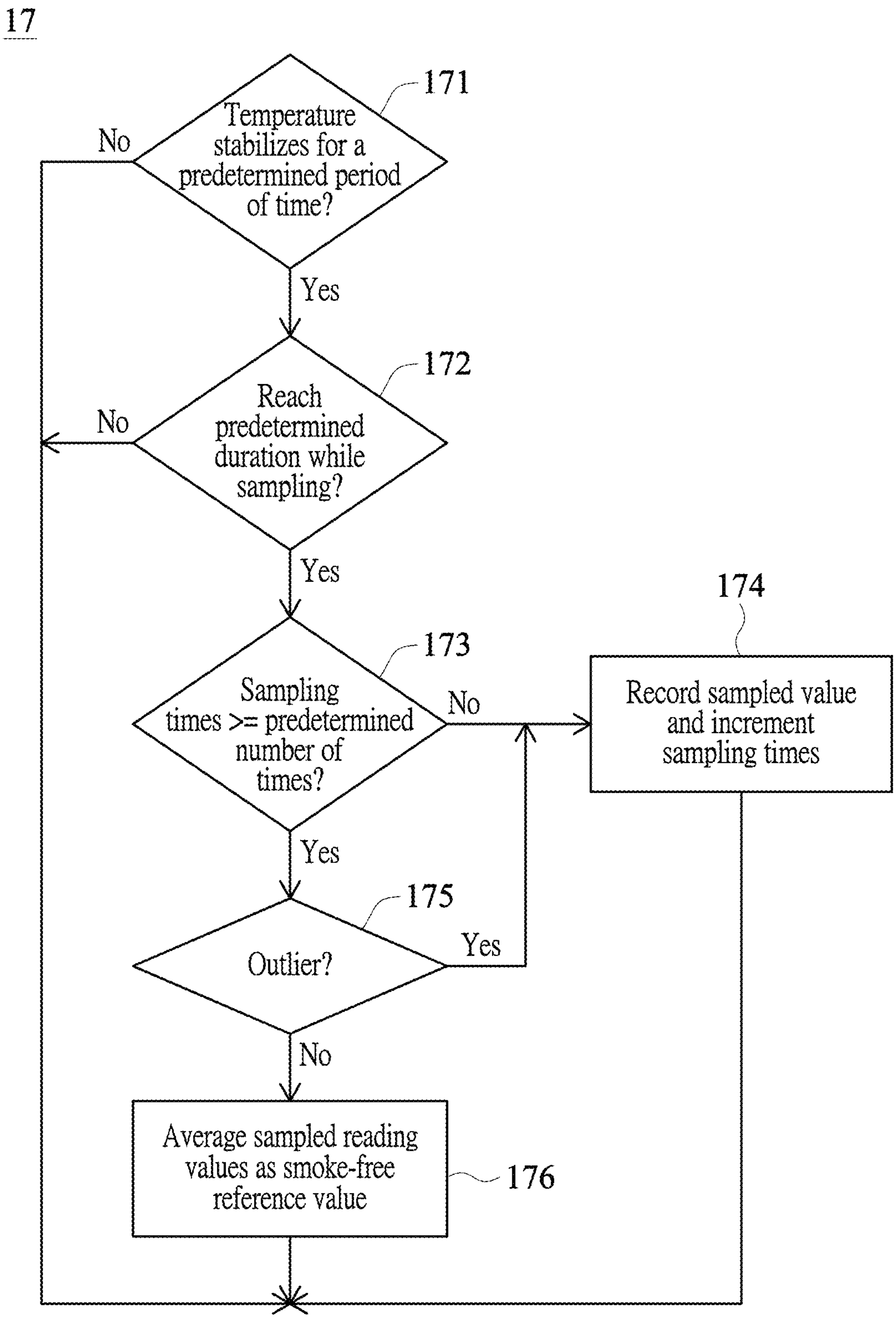
FIG. 2 shows a detailed flow diagram illustrating the temperature learning (step 17) of FIG. 1 according to one embodiment of the present invention.

FIG. 2 shows a detailed flow diagram illustrating the temperature learning (step 17) of FIG. 1 according to one embodiment of the present invention. Specifically, in step 171, it is determined whether the (current) temperature stabilizes for a predetermined period of time (e.g., 1 minute). If the determination result in step 171 is affirmative (yes branch of step 171), in steps 172-174, reading values (for each receiver sensor) in a smoke-free state are consecutively sampled for a predetermined number of times (e.g., 8 times) every predetermined duration (e.g., every 16 seconds), thereby obtaining the predetermined number of consecutive sampled reading values. Specifically speaking, in step 172, it is determined whether the predetermined duration (e.g., 16 seconds) has been reached. If yes (yes branch of step 172), in step 173, it is determined whether sampling times have reached the predetermined number of times (e.g., 8 times). If no (no branch of step 173), in step 174, the sampled value is (temporarily) recorded and the sampling times are incremented. Steps 172-174 are repeatedly performed until the sampling times have reached the predetermined number of times (yes branch of step 173).

Next, in step 175, it is determined whether there is an outlier among the sampled reading values. In the embodiment, an outlier exists when difference between the maximum value and the minimum value of the sampled reading values is greater than a predetermined threshold (e.g., 10). The outlier will be discarded and the sampling be resumed until the predetermined number of consecutive sampled reading values without outlier has been reached. Subsequently, in step 176, the sampled reading values are averaged as smoke-free reference values at the current temperature, which are then stored in the database.

Although specific embodiments have been illustrated and described, it will be appreciated by those skilled in the art that various modifications may be made without departing from the scope of the present invention, which is intended to be limited solely by the appended claims.

What is claimed is:

1. A smoke detection method with temperature and dust compensation, comprising:

providing a smoke detector that generates reading values;

providing a database that stores smoke-free reference values at every temperature or at every few temperatures in a working range of temperatures, differences between the reading values and corresponding smoke-free reference values being used to detect smoke;

obtaining smoke-free reference values at a current temperature from the database if temperature changes; and performing temperature learning to obtain smoke-free reference values if the smoke-free reference values do not exist in the database or when dust is detected for at least one time;

wherein the step of temperature learning comprises:

determining whether the current temperature stabilizes for a predetermined period of time;

consecutively sampling reading values in a smoke-free state for a predetermined number of times every predetermined duration, thereby obtaining the predetermined number of consecutive sampled reading values; and averaging the sampled reading values as being smoke-free reference values at the current temperature and being stored in the database.

2. The method of claim 1, wherein the step of temperature learning comprises:

determining whether there is an outlier among the sampled reading values; and discarding the outlier and resuming consecutively sampling reading values until the predetermined number of consecutive sampled reading values without outlier has been reached.

3. The method of claim 2, wherein the outlier exists when difference between a maximum value and a minimum value of the sampled reading values is greater than a predetermined threshold.

4. The method of claim 1, before generating the reading values, further comprising:

determining whether the smoke detector wakes up;

wherein the reading values are generated when the smoke detector wakes up.

5. The method of claim 4, before the step of determining whether the smoke detector wakes up, further comprising:

providing initial smoke-free reference values after the smoke detector is turned on and initialized.

6. The method of claim 1, further comprising:

determining whether a temporal number of dust compensation is equal to a predetermined required number of dust compensation if the temperature changes;

wherein the temporal number of dust compensation increments whenever dust has been detected for the at least one time.

7. The method of claim 6, wherein the temperature learning is performed if the temporal number of dust compensation is not equal to the required number of dust compensation.

8. The method of claim 1, wherein dust is detected according to the generated reading values and ratios thereof.

9. The method of claim 1, further comprising:

detecting smoke according to the generated reading values and ratio thereof.

10. The method of claim 1, wherein the smoke detector comprises at least one light source and at least one receiver sensor.

11. The method of claim 10, wherein the smoke detector comprises an infrared light source, a blue light source, a first receiver sensor adaptable to detect infrared light and blue light to generate two reading values, and a second receiver adaptable to detect infrared light and blue light to generate another two reading values.

12. The method of claim 1, further comprising:

issuing a maintenance alert notification when dust as detected reaches a first threshold at which the smoke detector still functions normally.

13. The method of claim 12, further comprising:

further issuing a maintenance warning notification to give notice of cleaning the smoke detector immediately to avoid subsequent false alarms when dust as detected reaches a second threshold at which the smoke detector cannot function normally, the second threshold being higher than the first threshold.

* * * * *